United States Patent [19]
Oestreich

[11] 4,129,356
[45] Dec. 12, 1978

[54] OPTICAL TRANSMISSION ELEMENT HAVING PROTECTIVE JACKET TO REDUCE ATTENUATION

[75] Inventor: Ulrich Oestreich, Berlin, Germany

[73] Assignee: Siemens Aktiengesellschaft, Berlin and Munich, Germany

[21] Appl. No.: 653,352

[22] Filed: Jan. 29, 1976

[30] Foreign Application Priority Data

Jan. 31, 1975 [DE] Fed. Rep. of Germany ....... 2504553

[51] Int. Cl.² .............................................. G02B 5/14
[52] U.S. Cl. .............................. 350/96.23; 350/96.29
[58] Field of Search ........ 350/96 R, 96 WG, 96 LM, 350/ 96 B

[56] References Cited

U.S. PATENT DOCUMENTS

| 3,813,141 | 5/1974 | Miller | 350/96 WG |
|---|---|---|---|
| 3,843,865 | 10/1974 | Nath | 350/96 LM X |
| 3,899,235 | 8/1975 | Arnaud et al. | 350/96 WG |
| 3,901,674 | 8/1975 | Strack et al. | 350/96 WG X |
| 4,038,489 | 7/1977 | Stenson et al. | 350/96 B X |
| 4,039,248 | 8/1977 | Franke et al. | 350/96 B |

FOREIGN PATENT DOCUMENTS

| 2023542 | 11/1971 | Fed. Rep. of Germany | 350/96 R |
|---|---|---|---|
| 457905 | 8/1968 | Switzerland | 350/96 R |
| 469276 | 4/1969 | Switzerland | 350/96 R |

*Primary Examiner*—John K. Corbin
*Assistant Examiner*—John D. Lee
*Attorney, Agent, or Firm*—Kenyon & Kenyon, Reilly, Carr & Chapin

[57] ABSTRACT

An improved optical transmission element comprising an optical fiber made of a core and a sheath surrounded by a protective jacket in which the inside of the protective jacket is approximately twice the diameter of the fiber and in no case less than 50 μm larger than the fiber with its sheath, the protective jacket having on its inside a plurality of ribs maintaining it spaced from the sheath of the fiber thereby reducing absorption and radiation of the sheath light and avoiding attenuation in the optical transmission element.

8 Claims, 3 Drawing Figures

OPTICAL TRANSMISSION ELEMENT HAVING PROTECTIVE JACKET TO REDUCE ATTENUATION

BACKGROUND OF THE INVENTION

This invention relates to optical transmission elements in general and more particularly to an improved fiber optic transmission system which includes a multilayer fiber comprising a core and sheath surrounded by a protective jacket.

Fibers for optical transmission made from a core having a higher index of refraction and sheath with a lower index of refraction are known in the art. In fibers of this nature the light introduced into the core is reflected back into the core by total reflection at the boundary surface between the core and sheath. Seen optically and geometrically, the light travels through the fiber in a zigzag fashion. Developments over recent years have led to fiber optic transmission elements with two dB of attenuation per kilometer of length. Such developments brings the transmission of information using optical wave guides into the realm of possibility. In addition to the unavoidable attenuation in the material of the core, however, further losses occur in fiber optics due to the fact that a portion of the light is transported in the sheath surrounding the core despite the total reflection. More specifically, there is a cylindrical layer of several micrometers thickness in which light travels. It has been recently discovered that the thickness of this layer depends on the optical coupling of the succeeding layers and thus on their optical characteristics. i.e., the index of refraction and coefficient of absoption. This component of light which travels through the sheath cannot be neglected, particularly where light is being transmitted over long distances without intermediate amplification. Thus, it becomes necessary to keep light losses in the sheath as low as possible. If the fiber is bent and forms a curve, the share of the light in the sheath is further increased with decreasing radius of curvature. This results from the fact that the angle of total reflection is more nearly approached and may partially be exceeded. To avoid higher attenuation, sheath light must not get lost. Such light can get lost through radiation into the environment, e.g. into the air, if the angle of total reflection prescribed therefor is exceeded. Such can happen, particularly where the outer sheath surface is irregular. Further losses can occur if a protective jacket surrounding the fiber consists a material having a higher index of refraction than the sheath material with the protective jacket directly in optical contact with the sheath surface. All plastic materials used for protective jackets have an index of refraction which is larger than that of the sheath. Under such circumstances an angle of total reflection no longer exists, i.e. all the light reaching this boundry surface leaves the sheath and is lost.

In view of these problems the need for an improved design for an optical transmission element in which attenuation due to radiated or absorbed sheath light is avoided becomes evident.

SUMMARY OF THE INVENTION

The present invention solves this problem by providing that the inside diameter of the protective jacket surrounding the fiber optic is approximately twice the diameter of the fiber and that it is in no case less than 50 μm larger than the latter.

Through such an arrangement the fiber lies loosely within the protective jacket and makes contact with it only in a few areas. The space between the fiber and the protective jacket can be filled with air or gas. In any event, it is filled with a medium having a lower index of refraction than the sheath. As a result, total reflection will occur in most cases at the boundary surface between the sheath and the directly adjacent layer, i.e. the air or gas. With good, smooth sheath surfaces very little light will be radiated. Just as in the case of total reflection at the boundary surface between the core and the sheath, a part of the light is transported in a cylindrical air layer around the sheath, even where total reflection between the sheath and, for example, the surrounding air, takes place. In order to avoid losing this light the spacing between the sheath and the protective jacket is made large enough so that, as far as possible, the light does not come contact with the protective jacket. The light that gets into the sheath returns in part into the core or is received at the other end as sheath light. In this manner the attenuation in the optical transmitting element is kept low. Thus, such elements are particularly well suited for use in cables with a short length of lay which, due to their installations in a local telephone exchange, for example, are frequently curved and where it is not practical to use interposed amplifiers.

In the specifically illustrated embodiment of the invention, the protective covering consists of a hard plastic which is not prone to cracks and has a high modulus of elasticity. This makes fabrication of a smooth inside surface of a protective jacket possible. As noted above, light will always be lost if the protective jacket comes into direct contact with the surface of the sheath. This latter effect is pressure dependent since the optical contact and the area in which the protective jacket touches the sheath depends on the force with which the protective jacket is pressed against the sheath. For this reason, a hard armor like protective jacket is proposed. Mechanical stresses, particularly over a small area, are taken up by the jacket and not transmitted to the fiber. In addition, direct contact between the protective jacket and the fiber is further prevented in this way since the fiber is bent over a shorter length, i.e. with a small radius of curvature. Thus, the share of light that can get into the sheath is reduced further. In addition, the danger of a break of the very sensitive optical fibers is decreased.

In connection with these various measures used to reduce attenuation, it has been found advantageous to employ a protective jacket having a defined and preferably very low absorption coefficient and index of refraction in the range of light wavelengths used. As noted above, the thickness of the layer in which the light is guided in the outer space depends, in case of total reflection, on the optical coupling of successive layers and therefore, on the behavior of the protective jacket. A very low absorption coefficient and index of refraction decreases the thickness of this layer and as a result the danger of the protective jacket getting into the vicinity of the layer. Of course, it is desireable to combine as many optical transmission elements together to form a cable as is possible. In such cases the danger of crosstalk through radiated light exists. For this reason, the protective jacket should have an absorbing effect in order to prevent cross coupling of radiated light. A compromise must be made in the two requirements. i.e. making the absorption coefficient of these jacket small to attain low attenuation and making it large so that no crosstalk coupling occurs. In accordance with the illustrated embodiment, it is preferred that the space between the fiber and protective jacket always be maintained at the same thickness. To accomplish this several inwardly directed, longitudinally extending ribs are used. These ribs should be as narrow as possible so that they will rest in the sheath only over a very small area. Ideally they should only rest linearly against the sheath.

It is preferable to make the ribs in the shape of wedges with the apex of each wedge resting on the surface of the sheath. This results in a good mechanical design and an almost linear contact between the protective jacket and the sheath. On the other hand, due to their wedge shape, the ribs have sufficient stability to withstand higher pressures such as can occur, for example, in curves. In order to centrally dispose the fibers within the protective jacket at least three, symmetrically disposed ribs are provided. To reduce contact areas still further the ribs can be made in a serrated form in the lengthwise direction so that rows of projections are obtained which rest against the sheath surface only in spots.

It is further advantageous that the ribs be arranged helically about the glass fiber. The share of the sheath light and the danger of absorption associated therewith in contacting ribs becomes increased particularly in curves. Through the use of a helical design it is insured that the ribs touch the sheath surfaces at these critical points only over a short path since they run, so to speak, transversely to the curvature.

The overall object in the design of optical transmission elements is to combine such elements into a cable similar to conventional electrical communication cables. In other words, it is desired to twist them as is done with conventional cables. Where the optical transmission elements of the present invention are to be used in such an application, it is advisable that the pitch of ribs which surround the fiber helically deviate from the length of lay of the cable to be manufactured. The length of lay of the cable, in particular, determines the curvature. Since the light leaves the sheath in curves essentially tangentially in an outward direction, having a different pitch for the helical ribs again insures that the contact area between the ribs and the surface of the sheath is kept small at such critical points. The protective jackets used in accordance with the preferred embodiment preferably are extruded onto the elements in air or a protective gas atmosphere. Through such measures a medium which has, in any event, an index of refraction smaller than the sheath will fill the space between the jacket and protective jacket. It would, of course, be possible to surround the fiber with an optical liquid having a smaller index of refraction than the sheath and, of course, an extremely small absorption coefficient instead of filling with air or gas. In view of the extremely small thicknesses of micrometers of space between the fiber and protective jacket and the desired length of several kilometers in such optical transmission elements, introducing liquid at a later time is out of the question. Thus, if liquid is to be used, the fiber should be surrounded with a liquid film of the liquid before the protective jacket is extruded onto it.

DETAILED DESCRIPTION OF THE PREFERRED EMBODIMENT

Figure 1:
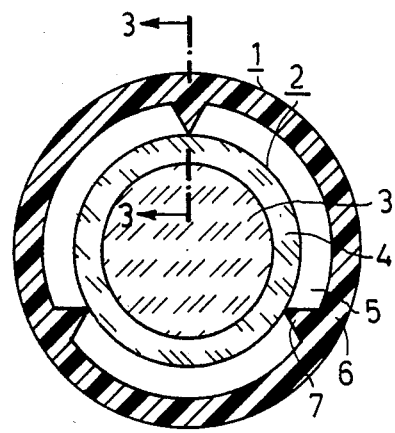
FIG. 1 is a cross-sectional view through the optical transmission element of the present invention.
Figure 2:
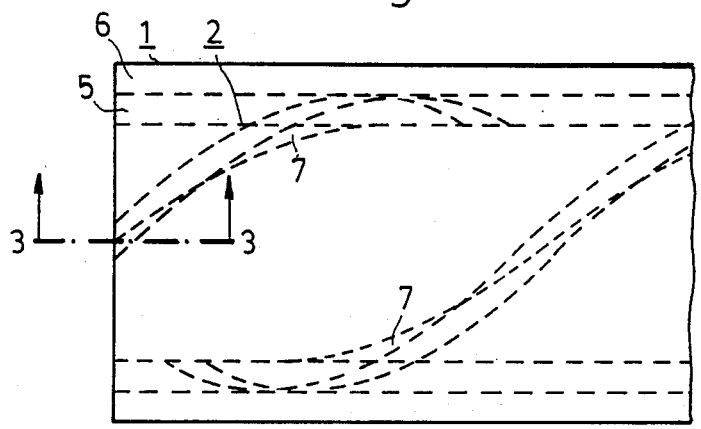
FIG. 2 is a plan view of the element of FIG. 1.
Figure 3:
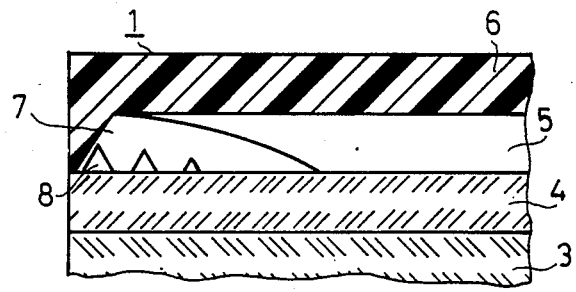
FIG. 3 is a cross-sectional view taken along the lines 3—3 of FIGS. 1 and 2.

In order to obtain an optical transmission element of overall low attenuation even under the flexure and mechanical stress, a loose protective jacket which is maintained, to the largest degree possible, at a defined spacing about the fiber is used. The protective jacket will be of a hard, elastic material which is not prone to cracks. Preferably, this material will be applied to the fiber using an extrusion or a stretch and draw process. The optical transmission member shown on the figure is not shown with actual dimensions, but only as an illustration of the elements of which it is made. Shown is the overall optical element 1 comprising an optical fiber 2 consisting of a core 3 and sheath 4. The core and sheath are surrounded by a protective jacket 6 of a hard elastic material. Suitable materials are plastic such as polypropylene or mixtures of polypropylene and other materials; polystyrene, nylon or polyesters. In any case, it should be a plastic having a high modulous of elasticity. The inside diameter of the protective jacket 6 is considerably larger than the outside of the fiber 2. The spacing between the fiber and protective jacket must be large enough that light guided in the space between does not come into contact with the protective jacket 6. As illustrated, in order to center the fiber 2 in the protective jacket, the latter is provided with three inwardly directed, wedge-shaped ribs 7. As shown by FIGS. 2 and 3, these are disposed helically about the fiber 2. This insures a defined spacing on all sides between the protective jacket 6 and the sheath 4, even under major mechanical stress. For using the optical transmission elements 1 in a cable, the pitch of the helical ribs 7 should differ from the length of lay of the cable. Also shown is the manner in which the apexes of the ribs 7 can contain serrations or gaps 8 so as to further minimize contact with the optical fiber 2.

Thus, an improved optical transmission element has been shown. Although a specific embodiment has been illustrated and described, it will be obvious to those skilled in the art that various modifications may be made without departing from the spirit of the invention which is intended to be limited solely by the appended claims.

What is claimed is:

1. In an optical transmission element of the type which is built up as a multi-layer fiber consisting of a core with a sheath surrounded by a protective jacket, the material of the sheath having a lower index of refraction than that of the core, the improvement comprising:
  (a) the inside diameter of the protective jacket being about twice the diameter of the fiber but in no case less than 50 $\mu$m larger than the latter;
  (b) the protective jacket comprising a hard plastic material which is not crack prone and has a high modulus of elasticity whereby a smooth inside surface of the protective jacket is possible; and
  (c) said protective jacket having a defined, preferably very small, absorption coefficient and a low index of refraction in the range of light wave length used.

2. The improvement according to claim 1 wherein said protective jacket is supported against the surface of said sheath by means of a plurality of inwardly directed, longitudinally disposed ribs.

3. The improvement according to claim 2 wherein said ribs are in the form of wedges with the apexes of said wedges resting against the surface of said sheath.

4. The improvement according to claim 3 wherein three symmetrically disposed ribs are provided.

5. The improvement according to claim 4 wherein said ribs contain interruptions in the longitudinal direction.

6. The improvement according to claim 5 wherein said ribs are arranged helically around the fiber.

7. The improvement according to claim 4 wherein said ribs are arranged helically around the fiber.

8. The improvement according to claim 2 wherein said ribs are arranged helically around the fiber.

* * * * *